United States Patent
Fan et al.

(10) Patent No.: US 11,695,319 B2
(45) Date of Patent: Jul. 4, 2023

(54) INTERLEAVED SWITCHING CONVERTER WITH QUASI-RESONANT CONTROL AND CONTROL METHOD THEREOF

(71) Applicant: Hangzhou MPS Semiconductor Technology Ltd., Hangzhou (CN)

(72) Inventors: Zilin Fan, Hangzhou (CN); Guangzhuo Li, Hangzhou (CN); Siran Wang, Hangzhou (CN)

(73) Assignee: Hangzhou MPS Semiconductor Technology Ltd., Hangzhou (CN)

(*) Notice: Subject to any disclaimer, the term of this patent is extended or adjusted under 35 U.S.C. 154(b) by 80 days.

(21) Appl. No.: 17/474,698

(22) Filed: Sep. 14, 2021

(65) Prior Publication Data

US 2022/0103078 A1 Mar. 31, 2022

(30) Foreign Application Priority Data

Sep. 28, 2020 (CN) .......................... 202011045370.9

(51) Int. Cl.
*H02M 3/335* (2006.01)
*H02M 1/00* (2006.01)
*H02M 3/28* (2006.01)

(52) U.S. Cl.
CPC ......... *H02M 1/0043* (2021.05); *H02M 3/285* (2013.01); *H02M 3/33507* (2013.01); *H02M 3/33515* (2013.01)

(58) Field of Classification Search
CPC ............... H02M 3/285; H02M 1/0043; H02M 3/33507; H02M 3/33515; H02M 3/1584; H02M 3/1586; H02M 7/493
See application file for complete search history.

(56) References Cited

U.S. PATENT DOCUMENTS

| | | | | |
|---|---|---|---|---|
| 5,508,903 | A * | 4/1996 | Alexndrov | H02M 3/33569 363/16 |
| 10,348,182 | B2 | 7/2019 | Wang | |
| 2015/0003119 | A1* | 1/2015 | Li | H02M 3/33507 363/21.13 |
| 2019/0006935 | A1* | 1/2019 | Wang | H02M 3/33507 |
| 2021/0184584 | A1 | 6/2021 | Wang | |
| 2022/0085715 | A1* | 3/2022 | Su | H02M 1/44 |

* cited by examiner

*Primary Examiner* — Alex Torres-Rivera
(74) *Attorney, Agent, or Firm* — Perkins Coie LLP

(57) ABSTRACT

A control circuit and control method for an interleaved switching converter having a first and second interleaved voltage regulating circuit. The control method is: controlling a first switch of the first voltage regulating circuit operating in quasi-resonant mode, turning ON a second switch of the second voltage regulating circuit after the first switch is turned ON for a half switching period, generating a current sensing signal by detecting a current flowing through the second switch, generating a peak signal, wherein the peak signal is adjusted when a voltage across the second switch is higher than a voltage reference at the time the second switch is turned ON, and turning OFF the second switch when the current sensing signal increases to the peak signal.

19 Claims, 9 Drawing Sheets

_US 11,695,319 B2_

1

INTERLEAVED SWITCHING CONVERTER WITH QUASI-RESONANT CONTROL AND CONTROL METHOD THEREOF

CROSS-REFERENCE TO RELATED APPLICATIONS

This application claims the benefit of CN application 202011045370.9, filed on Sep. 28, 2020, and incorporated herein by reference.

TECHNICAL FIELD

The present invention generally relates to electronic circuits, and more particularly but not exclusively, to interleaved switching converters with quasi-resonant control and control methods thereof.

BACKGROUND

There are two main control methods used in a switching converter. One is fixed frequency control and the other is variable frequency control. Although the fixed frequency control is more widely adopted, it suffers from high switching loss and efficiency variation with load or input voltage. These disadvantages are overcome by the variable frequency control.

An example of the variable frequency control is quasi-resonant control. FIG. 1 illustrates example waveforms of a switching converter with quasi-resonant control. The switching converter with quasi-resonant control works under CRM (critical-current-mode), which means once a current flowing through an energy storage component reaches zero, a switch is turned ON to increase the current flowing through the energy storage component. When a current sense signal CS indicative of the current flowing through the energy storage component decreases to zero, the energy storage component resonates with the parasitic capacitance of the switch. The switch is turned ON by a switching control signal Dry when a voltage VDS across the switch reaches its resonant valley (valley point of the voltage VDS during resonance) which is called valley switching, so as to reduce the switching loss. The switch is turned OFF by the switching control signal Dry when the current sense signal CS reaches a threshold, which may be a feedback signal related to the output voltage of the switching converter.

Based on many advantages including a reduction in power components stress, a reduction in output current ripple, and double the output power, an interleaved switching converter is often adopted. In an interleaved quasi-resonant switching converter with two phases, phase A and phase B has a 180-degree phase shift. The 180-degree phase shift should be accurate, otherwise the input current will superpose together. At the same time, the frequency of phase B should keep up with the phase A, which can help improve audible noise performance. However, when operating in DCM mode, it may be difficult to control phases A and B both operating in quasi-resonant mode due to non-ideal deviation between two phases.

Therefore, there is a need in the art for a control method and a control circuit for controlling interleaved switching converters with interleaving operation and quasi-resonant control simultaneously.

SUMMARY

Embodiments of the present invention are directed to a control circuit for an interleaved switching converter having a first and a second interleaved voltage regulating circuit. The control circuit comprises a first controller and a second controller. Wherein the first controller is configured to control a first switch of the first voltage regulating circuit operating in quasi-resonant mode. The second controller is configured to control a second switch of the second voltage regulating circuit.

The second controller comprises a phase-shifted control circuit, a valley detection circuit, a peak signal generator and a peak comparison circuit. The phase-shifted control circuit is configured to provide a second ON control signal for turning-ON the second switch after the first switch is turned ON for a half switching period. The valley detection circuit is configured to provide a valley pulse signal in response to one or more valleys of a voltage across the second switch during each OFF-time of the second switch. The peak signal generator is configured to provide a peak signal based on the valley pulse signal, the second ON control signal and a threshold signal, and the peak signal is adjusted when the voltage across the second switch is higher than a valley reference at the time the second switch is turned ON. The peak comparison circuit is configured to compare the peak signal with a current sensing signal indicative of a current flowing through the second switch and provide a second OFF control signal for turning OFF the second switch.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
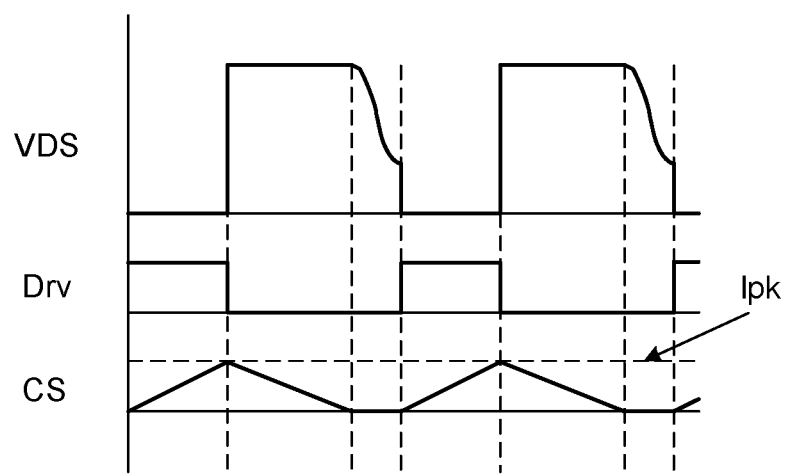
FIG. 1 illustrates example waveforms of a switching converter with quasi-resonant control.
Figure 2:
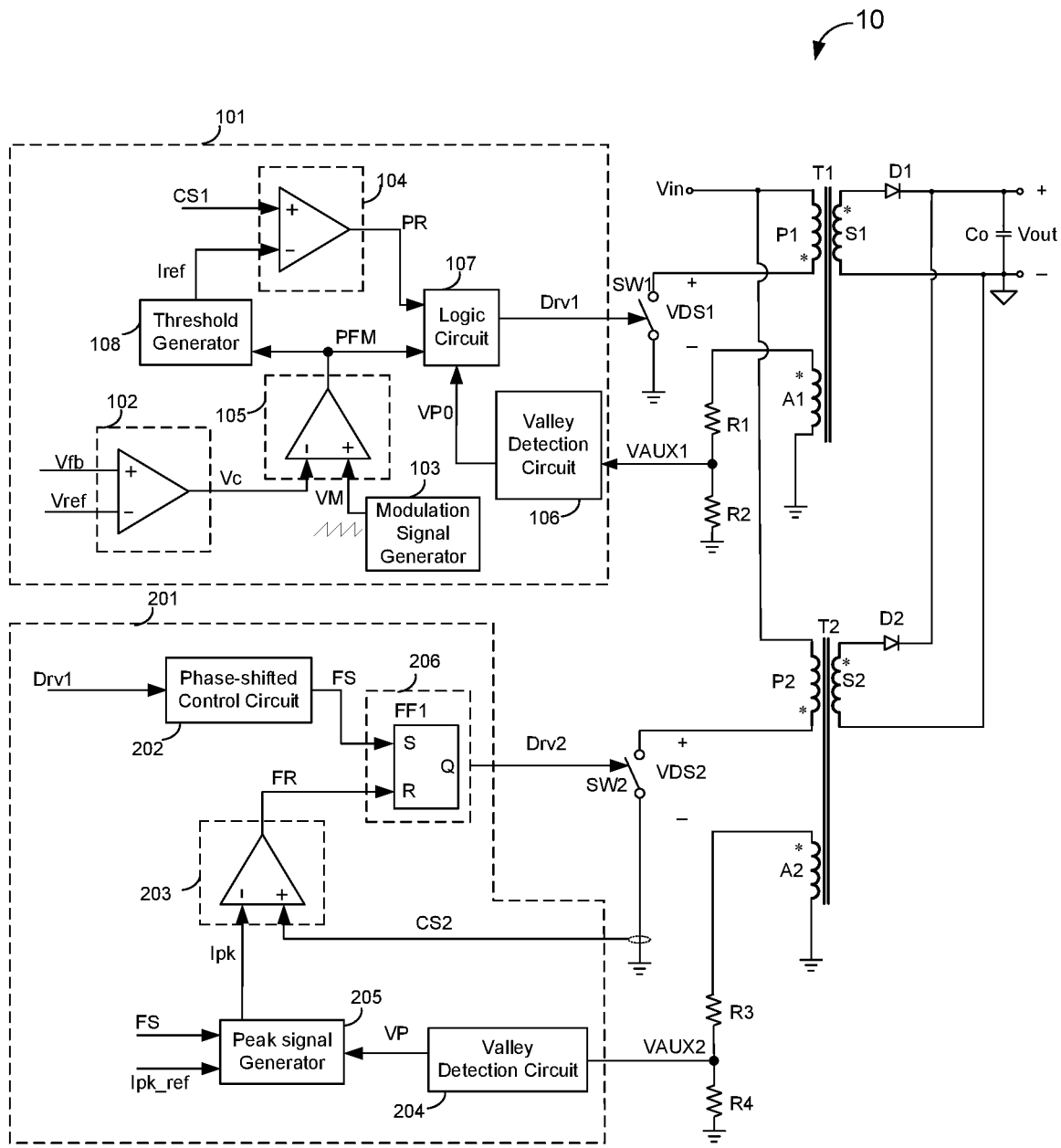
FIG. 2 illustrates a block diagram of an interleaved switching converter 10 with quasi-resonant control in accordance with an embodiment of the present invention.

FIG. 2 illustrates a block diagram of an interleaved switching converter 10 with quasi-resonant control in accordance with an embodiment of the present invention. In the example of FIG. 2, the interleaved switching converter 10 comprises a control circuit and a first and second interleaved voltage regulating circuit. Wherein the first voltage regulating circuit comprises a transformer T1, a first switch SW1, a diode D1 and an output capacitor Co. The second voltage regulating circuit comprises a transformer T2, a second switch SW2, a diode D2 and the common output capacitor Co. The control circuit comprises a first controller 101 and a second controller 201. The interleaved switching converter 10 is configured to convert an input voltage Vin to an output voltage Vout that provides to a load via interleaving operation of the first switch SW1 and the second switch SW2.

As shown in FIG. 2, the first controller 101 is coupled to the first switch SW1 and is configured to provide a first control signal Drv1 for controlling the first switch SW1 operating in quasi-resonant mode or CCM mode. The first control signal Drv1 has a plurality of switching periods wherein each switching period has an ON-time and an OFF-time. The first controller 101 comprises an error amplifying circuit 102, a modulation signal generator 103, a first comparison circuit 104, a second comparison circuit 105, a valley detection circuit 106, a logic circuit 107 and a threshold generator 108.

In the example of FIG. 2, the error amplifying circuit 102 comprises an operational amplifier. The operational amplifier has a non-inverting input terminal, an inverting input terminal, and an output terminal, wherein the non-inverting input terminal is configured to receive a feedback signal Vfb indicative of the output voltage Vout, the inverting input terminal is configured to receive a reference signal Vref. Based on a difference between the reference signal Vref and the feedback signal Vfb, the error amplifying circuit 102 generates a compensation signal Vc at the output terminal. The modulation signal generator 103 is configured to generate a modulation signal VM that may be saw tooth signal, triangular signal or any other suitable signals.

The first comparison circuit 104 has a non-inverting input terminal, an inverting input terminal, and an output terminal, wherein the non-inverting input terminal is configured to receive a sensing signal CS1 indicative of a current flowing through the first switch SW1, the inverting input terminal is configured to receive a current threshold signal Iref. Based on the comparison of the sensing signal CS1 and the current threshold signal Iref, the first comparison circuit 104 provides a first OFF control signal PR for turning OFF the first switch SW1. The current sensing method can be configured in any conventional method. In other embodiments, the sensing signal CS1 may be obtained by sensing a current flowing through a primary winding P1 or a secondary winding S1 of the transformer T1.

The second comparison circuit 105 has a non-inverting input terminal, an inverting input terminal and an output terminal. Wherein the non-inverting input terminal is coupled to the modulation signal generator 103 to receive the modulation signal VM, the inverting input terminal is coupled to the error amplifying circuit 102 to receive the compensation signal Vc. Based on the comparison of the compensation signal Vc and the modulation signal VM, the second comparison circuit 105 is configured to provide a frequency control signal PFM at the output terminal. In the embodiment shown in FIG. 2, the threshold generator 108 is coupled to the output terminal of the second comparison circuit 105 to receive the frequency control signal PFM and provides the current threshold signal Iref based on the frequency control signal PFM. In another embodiment, the threshold generator 108 is coupled to the output terminal of the error amplifying circuit 102 to receive the compensation signal Vc and provides the current threshold signal Iref based on the compensation signal Vc.

The valley detection circuit 106 is coupled to an auxiliary winding A1 of the transformer T1, receives a first reflected voltage VAUX1 during OFF-time of the first switch SW1, and provides a valley pulse signal VP0 in response to one or more valleys of a demagnetizing resonance, by detecting the valleys of the first reflected voltage VAUX1. In other embodiment, during each OFF-time of the first switch SW1, the valley detection circuit 106 is configured to provide the valley pulse signal VP0 in response to detecting one or more valleys of a voltage VDS1 across the first switch SW1, more specifically, by detecting the time when the voltage VDS1 across the first switch SW1 is higher than a valley threshold ZCD_ref1.

The logic circuit 107 has a first input terminal, a second input terminal, a third input terminal and an output terminal, wherein the first input terminal is configured to receive the frequency control signal PFM, the second input terminal is configured to receive the first OFF control signal PR, and the third input terminal is configured to receive the valley pulse signal VP0, based on the frequency control signal PFM, the first OFF control signal PR and the valley pulse signal VP0, the logic circuit 107 is configured to output the first control signal Drv1 at the output terminal.

The first controller 101 may work in CCM mode or quasi-resonant mode. When the interleaved switching converter 10 works in CCM mode, the first control signal Drv1 provided by the logic circuit 107 is configured to turn ON the first switch SW1 based on the frequency control signal PFM. While the interleaved switching converter 10 works in non-CCM mode with quasi-resonant control, the first switch SW1 is turned ON at a valley point of demagnetizing resonance. In this way, the turning ON loss and related EMI noise can both be minimized. Besides, when the sensing signal CS1 reached the current threshold signal Iref, the first switch SW1 is turned OFF.

The second controller 201 is coupled to the second switch SW2 and is configured to provide a second control signal Drv2 for controlling the second switch SW2. In the example of FIG. 2, the second controller 201 comprises a phase-shifted control circuit 202, a peak comparison circuit 203, a valley detection circuit 204, a peak signal generator 205 and a logic circuit 206.

The phase-shifted control circuit 202 is configured to receive a first control signal Drv1, and turns ON the second switch SW2 after the first switch SW1 is turned ON for half a switching period.

The valley detection circuit 204 is configured to generate a valley pulse signal VP in response to detecting one or more valleys of a second reflected voltage VAUX2 form an auxiliary winding A2 of the transformer T2. In other embodiment, the valley detection circuit 204 is coupled to the second switch SW2, and the valley pulse signal VP is generated in response to detecting one or more valleys of a voltage across the second switch SW2 during each OFF time of the second switch SW2.

More specifically, when the second reflected voltage VAUX2 is higher than a second valley reference signal, which means the voltage VDS2 across the second switch SW2 is higher than a valley reference ZCD_ref2, the valley pulse signal VP is at a low level. When the second reflected voltage VAUX2 is less than the second valley reference signal, which means the voltage VDS2 across the second switch SW2 is less than the valley reference ZCD_ref2, the valley pulse signal VP is pulse signal with a high level.

In the example of FIG. 2, the peak signal generator 205 has a first input terminal to receive the valley pulse signal VP, a second input terminal to receive the second ON control signal FS, a third input terminal to receive a threshold signal Ipk-ref and an output terminal to provide a peak signal Ipk. Wherein when the voltage VDS2 across the second switch SW2 is higher than the valley reference ZCD_ref2 at the time the second switch SW2 is turned ON, the peak signal Ipk is adjusted. In one embodiment, the peak signal Ipk is the sum of a peak regulating signal OFFSET and the threshold signal Ipk_ref. In one embodiment, the threshold signal Ipk_ref is related to the second ON control signal FS.

The peak comparison circuit 203 has a non-inverting terminal, an inverting terminal and an output terminal, wherein the non-inverting terminal is configured to receive a current sensing signal CS2 indicative of a current flowing through the second switch SW2, the inverting terminal is coupled to receive the peak signal Ipk. Based on the current sensing signal CS2 and the peak signal Ipk, the peak comparison circuit 203 outputs a second OFF control signal FR for turning OFF the second switch SW2.

The logic circuit 206 comprises a RS flip-flop FF1. The RS flip-flop FF1 has a set terminal, a reset terminal and an output terminal, wherein the set terminal is coupled to the phase-shifted control circuit 202 to receive the second ON control signal FS, the reset terminal is coupled to the peak comparison circuit 203 to receive the second OFF control signal FR. Based on the second ON control signal FS and the second OFF control signal FR, the logic circuit 206 provides a second control signal Drv2 for controlling the second switch SW2.

In the example of FIG. 2, when the second ON control signal FS sets the RS flip-flop FF1, the second control signal Drv2 is configured to turn ON the second switch SW2, energy is saved in a primary winding P2 of the transformer T2. When the current sensing signal CS2 is increased to reach the peak signal Ipk, the second OFF control signal FR provided by the peak comparison circuit 203 resets the RS flip-flop FF1. The second switch SW2 is turned OFF by the second control signal Drv2, the energy is transferred from the primary winding P2 to secondary winding S2 of the transformer T2.

Figure 3:
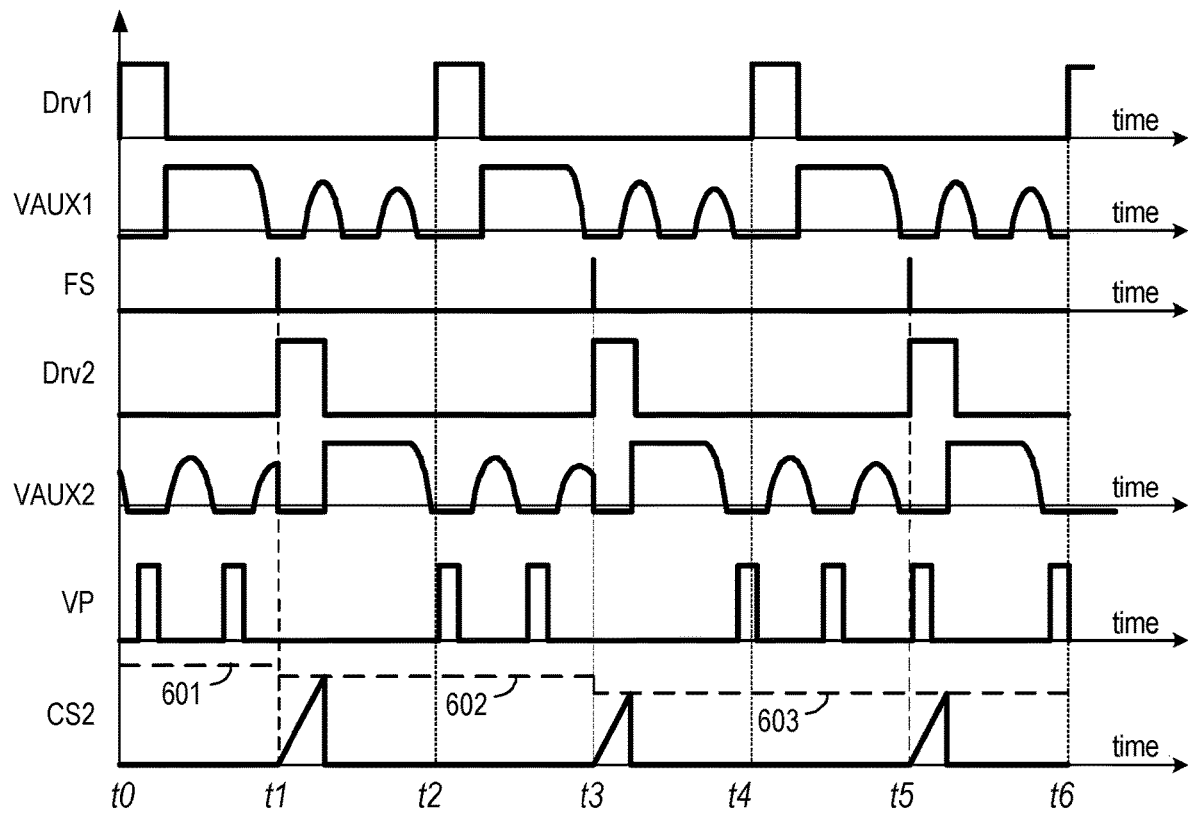
FIG. 3 illustrates working waveforms of the interleaved switching converter 10 shown in FIG. 2 in accordance with an embodiment of the present invention.

FIG. 3 illustrates working waveforms of the interleaved switching converter 10 shown in FIG. 2 in accordance with an embodiment of the present invention.

In the example of FIG. 3, the interleaved switching converter 10 works in DCM mode, and firstly the first voltage regulating circuit works in quasi-resonant mode. The first control signal Drv1 has switching periods including t0~t2, t2~t4, t4~t6, etc.

At time t0, the first switch SW1 is turned ON. After the first switch SW1 is turned ON for a half switching period, the second switch SW2 is turned ON at time t1. At the same time, the second reflected voltage VAUX2 is higher than the second valley reference signal, which means the turning-ON of the second switch SW2 is not valley switching, the peak signal Ipk needs to be adjusted, and accordingly the peak signal Ipk is decreased from 601 to 602. When the current sensing signal CS2 is increased to reach the peak signal Ipk, the second switch SW2 is turned OFF.

At time t3, the second switch SW2 is turned ON again after the first switch SW1 is turned ON for the half switching period. However, the second reflected voltage VAUX2 is still higher than the second valley reference signal, the turning-ON of the second switch SW2 is still not the valley switching, the peak signal Ipk needs to be further adjusted, and thus the peak signal Ipk is decreased to be 603. Until the time t5, the turning-ON of the second switch SW2 becomes valley switching, then the peak signal Ipk keeps unchanged, and accordingly the peak signal Ipk maintains at 603, as shown in FIG. 3.

Figure 4:
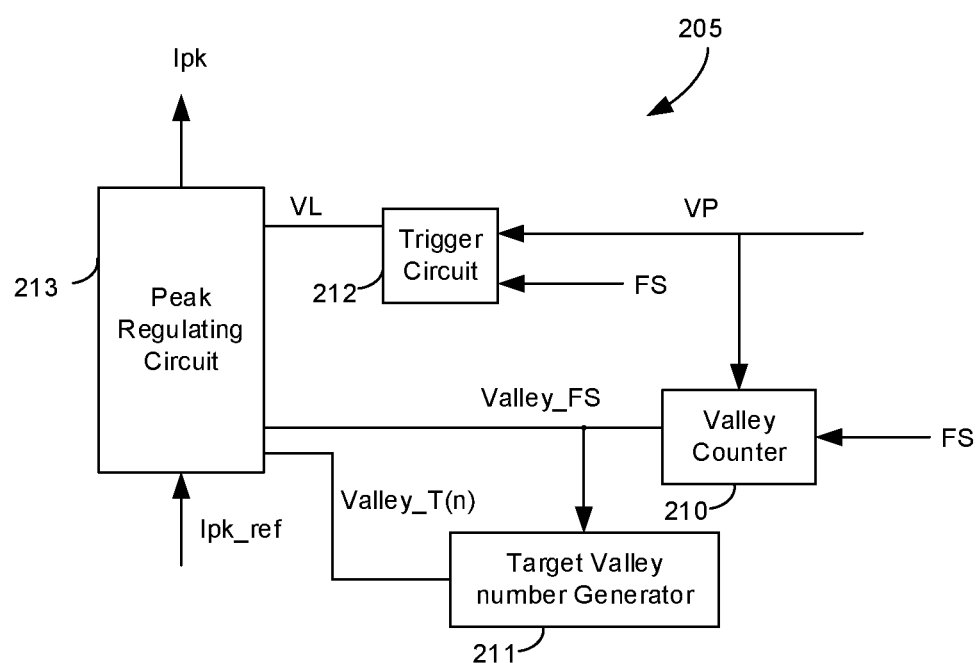
FIG. 4 illustrates a block diagram of a peak signal generator 205 in accordance with an embodiment of the present invention.

FIG. 4 illustrates a block diagram of a peak signal generator 205 in accordance with an embodiment of the present invention. As shown in FIG. 4, the peak signal generator 205 comprises a valley counter 210, a target valley number generator 211, a trigger circuit 212 and a peak regulating circuit 213. The valley counter 210 is coupled to the valley detection circuit 204 to receive the valley pulse signal VP, and is configured to provide a current valley count Valley_FS by counting the valley number in each OFF-time of the second switch SW2. The target valley number generator 211 provides a current target valley number Valley_T(n) based on the current valley count Valley_FS and a last target valley number Valley_T(n−1) in the last switching period of the second switch SW2. The trigger circuit 212 is configured to assert a trigger signal VL when the voltage VDS2 across the second switch SW2 is higher than the valley reference ZCD_ref2 at the time the second switch SW2 is turned ON. In one embodiment, the trigger circuit 212 is configured to receive the second ON control signal FS and the valley pulse signal VP, and provides a trigger signal VL. In another embodiment, the trigger signal VL is asserted when the second reflected voltage VAUX2 is higher than the second valley reference signal at the time when the second switch SW2 is turned ON.

The peak regulating circuit 213 is configured to add a peak regulating signal OFFSET to the threshold signal Ipk_ref. The peak regulating signal OFFSET is adjusted when the trigger signal VL is asserted based on the comparison of the current valley count Valley_FS and the current target valley number Valley_T(n). In one embodiment, when the current valley count Valley_FS is higher than the current target valley number Valley_T(n), the peak regulating signal OFFSET decreases. When the current valley count Valley_FS is less than the current target valley number Valley_T(n), the peak regulating signal OFFSET increases.

Figure 5:
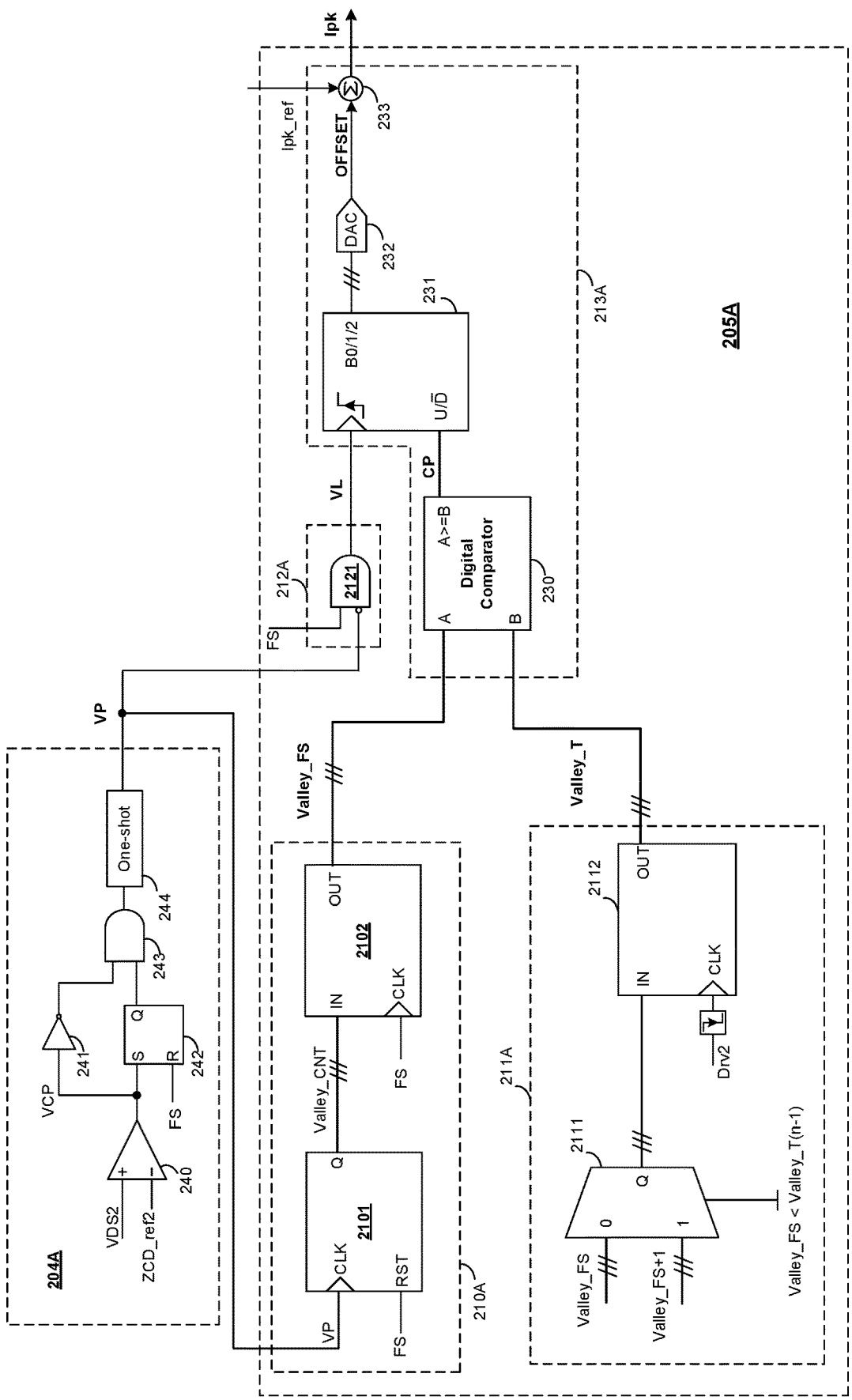
FIG. 5 illustrates a valley detection circuit 204A and a peak signal generator 205A in accordance with an embodiment of the present invention.

FIG. 5 illustrates a valley detection circuit 204A and a peak signal generator 205A in accordance with an embodiment of the present invention. In the example of FIG. 5, the valley detection circuit 204A comprises a valley comparator 240, an OR gate 241, a RS flip-flop 242, an AND gate 243 and a one-shot circuit 244. The valley comparator 240 has a non-inverting terminal, an inverting terminal and an output terminal, wherein the non-inverting terminal is configured to receive the voltage VDS2 across the second switch SW2, the inverting terminal is configured to receive the valley reference ZCD_ref2. The valley comparator 240 compares the voltage VDS2 and the valley reference ZCD_ref2 and provides a valley comparison signal VCP at the output terminal.

The RS flip-flop 242 has a set terminal, a reset terminal and an output terminal, wherein the set terminal is configured to receive the valley comparison signal VCP, the reset terminal is configured to receive the second control signal Drv2. The AND gate 243 has a first input terminal, a second input terminal and an output terminal, wherein the first input terminal is coupled to receive the valley comparison signal VCP through the OR gate circuit 241, the second input terminal is coupled to the output terminal of the RS flip-flop 242. The one-shot circuit 244 has an input terminal and an output terminal, wherein the input terminal is coupled to the output terminal of the AND gate 243. The one-shot circuit 244 provides the valley pulse signal VP at the output terminal. when the voltage VDS2 across the second switch SW2 is higher than the valley reference ZCD_ref2, the valley comparison signal VCP has a high level, the output of the AND gate 243 is at a low level, and there is no output at the output terminal of the one-shot circuit 244. When the voltage VDS2 across the second switch SW2 is less than the valley reference ZCD_ref2, the valley comparison signal VCP becomes low level from high level, the output of the AND gate 243 is at the high level, the one-shot circuit is configured to provide the valley pulse signal VP with a single pulse. When the second ON control signal FS becomes high, the RS flip-flop 242 is set and the output of the AND gate 243 is at the low level, the one-shot circuit 244 is stopped.

Embodiments of the invention, however, are not limited to such valley detection circuit 204A shown in FIG. 5, and any conventional valley detection techniques for providing valley pulse signal in response to every valley may also be utilized in the valley detection circuit.

In the example shown in FIG. 5, the peak signal generator 205A comprises a valley counter 210A, a target valley number generator 211A, a trigger circuit 212A and the peak regulating circuit 213A.

The valley counter 210A comprises a digital counter 2101 and a digital register 2102. The digital counter 2101 has a clock terminal, a reset terminal and an output terminal, wherein the clock terminal is coupled to the valley detection circuit 204A to receive the valley pulse signal VP, the reset terminal is configured to receive the second ON control signal FS. Based on the valley pulse signal VP and the second ON control signal FS, the digital counter 2101 provides a detected valley count Valley_CNT. The digital register 2102 is configured to receive the detected valley count Valley_CNT when the second switch SW2 is turned ON, and provides a current valley count Valley_FS.

The target valley number generator 211A comprises a selector 2111 and a register 2112. The selector 2111 is configured to select the current valley count Valley_FS or Valley_FS+1 as a selection output based on the comparison of the current valley count Valley_FS and the last target valley number Valley_T(n−1). In detail, when the current valley count valley_FS is less than Valley_T(n−1), the valley selector selects the current valley count Valley_FS as the selection output. When Valley_FS is higher than Valley_T (n−1), the selector 2111 selects Valley_FS+1 as the selection output.

The register 2112 is configured to receive the selection output of the selector 2111 and provide the current target valley number Valley_T(n) when the second switch SW2 is turned OFF. The register 2112 has an input terminal coupled to the output terminal of the digital selector 2111, a clock terminal to receive the second control signal Drv2 through a downward trigger provides the current target valley number Valley_T(n) at an output terminal.

In the example of FIG. 5, the trigger circuit 212A comprises a AND gate 2121. The AND gate 2121 has a high-level input terminal, a low-level input terminal and an output terminal. Wherein the high-level input terminal is configured to receive the second ON control signal FS, the low-level input terminal is coupled to the valley detection circuit 204A to receive the valley pulse signal VP. When the second ON control signal FS becomes high level from low level and the second switch SW2 is not valley switching, the trigger signal VL generated by the trigger circuit 212A is asserted.

As shown in FIG. 5, the peak regulating circuit 213A comprises a digital comparator 230, a D flip-flop 231, a digital-to-analog conversion circuit 232 and a summing circuit 233. The digital comparator 230 is configured to compare the current valley count Valley_FS with the current target valley number Valley_T(n) and provide a digital comparison signal CP. The D flip-flop 231 is configured to receive the digital comparison signal CP when the trigger signal VL is asserted. The D flip-flop 231 has an input terminal, a clock terminal and an output terminal, wherein the input terminal is coupled to the digital comparator 230 to receive the digital comparison signal CP, the clock terminal is coupled to the trigger circuit 212 to receive the trigger signal VL. The digital-to-analog conversion circuit 232 has an input terminal and an output terminal, wherein the input terminal is coupled to the output terminal of the D flip-flop 231, the digital-to-analog conversion circuit 232 provides the analog peak regulating signal OFFSET at the output terminal. In one embodiment, the peak regulating signal OFFSET has a preset maximum value OFFSET_MAX and a preset minimum value OFFSET_MIN. In one embodiment, the peak regulating signal OFFSET changes in the form of triangle waves or saw-tooth waves between the maximum value OFFSET_MAX and the minimum value OFFSET_MIN.

The summing circuit 233 has a first input terminal, a second input terminal and an output terminal, wherein the first input terminal is configured to receive the peak regulating signal OFFSET, the second input terminal is coupled to the threshold signal Ipk_ref. The summing circuit 233 adds the peak regulating signal OFFSET to the threshold signal Ipk_ref, and provides the peak signal Ipk at the output terminal.

Figure 6:
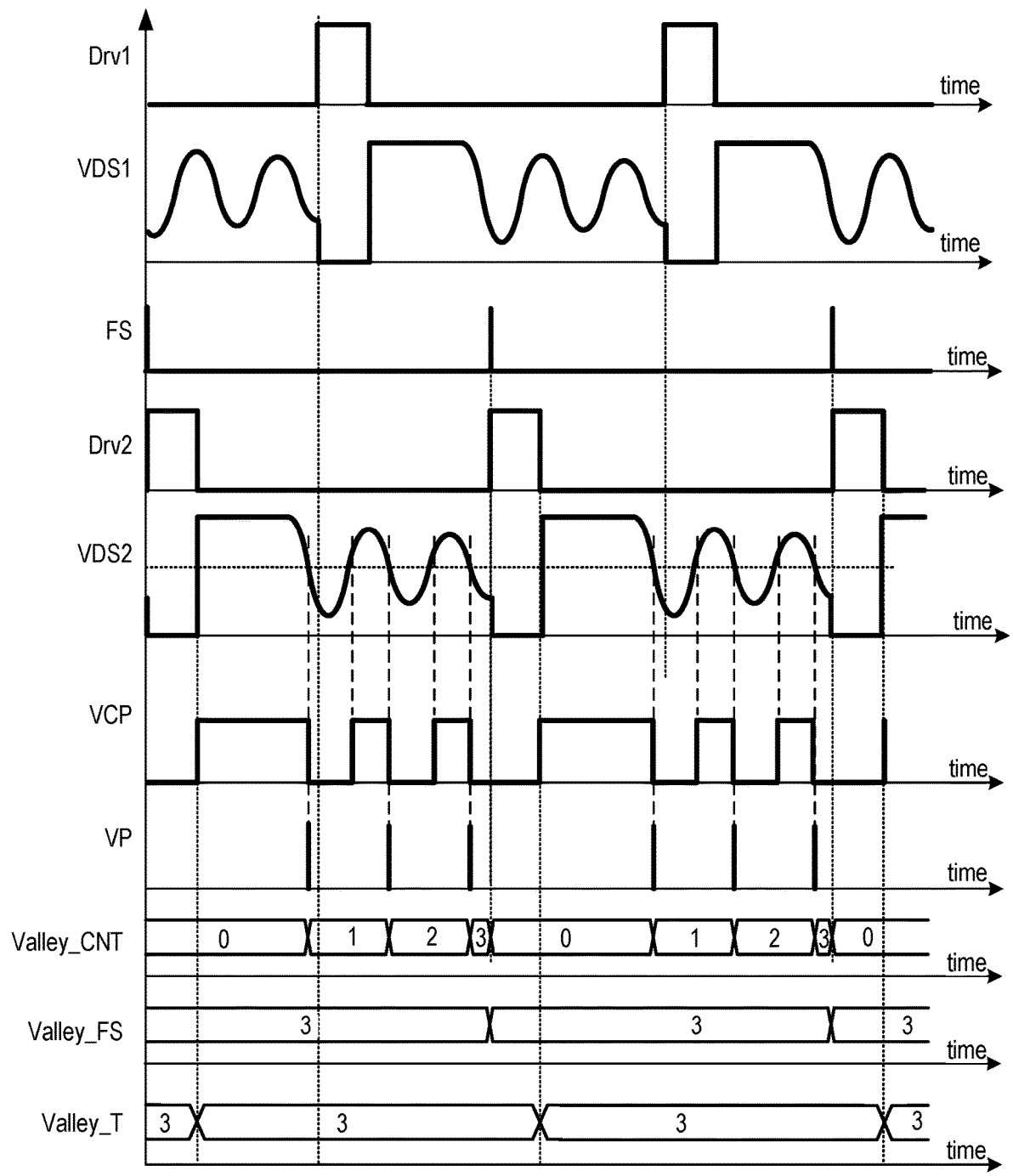
FIG. 6 illustrates working waveforms of the circuit shown in FIG. 5 in accordance with an embodiment of the present invention.

FIG. 6 illustrates working waveforms of the circuit shown in FIG. 5 in accordance with an embodiment of the present invention. In the example of FIG. 6, the valley counter 210A is configured to detect the current valley count Valley_FS at the time when the second switch SW2 is turned ON, the target valley number generator 211A is configured to provide the current target valley number Valley_T(n) at the time when the second switch SW2 is turned OFF.

In the example of FIG. 6, the current valley count Valley_FS equals to the current target valley number Valley_T(n), and the peak regulating signal OFFSET keeps unchanged, the peak signal Ipk also keeps unchanged, the first switch SW1 and the second switch SW2 both are valley switching.

Figure 7:
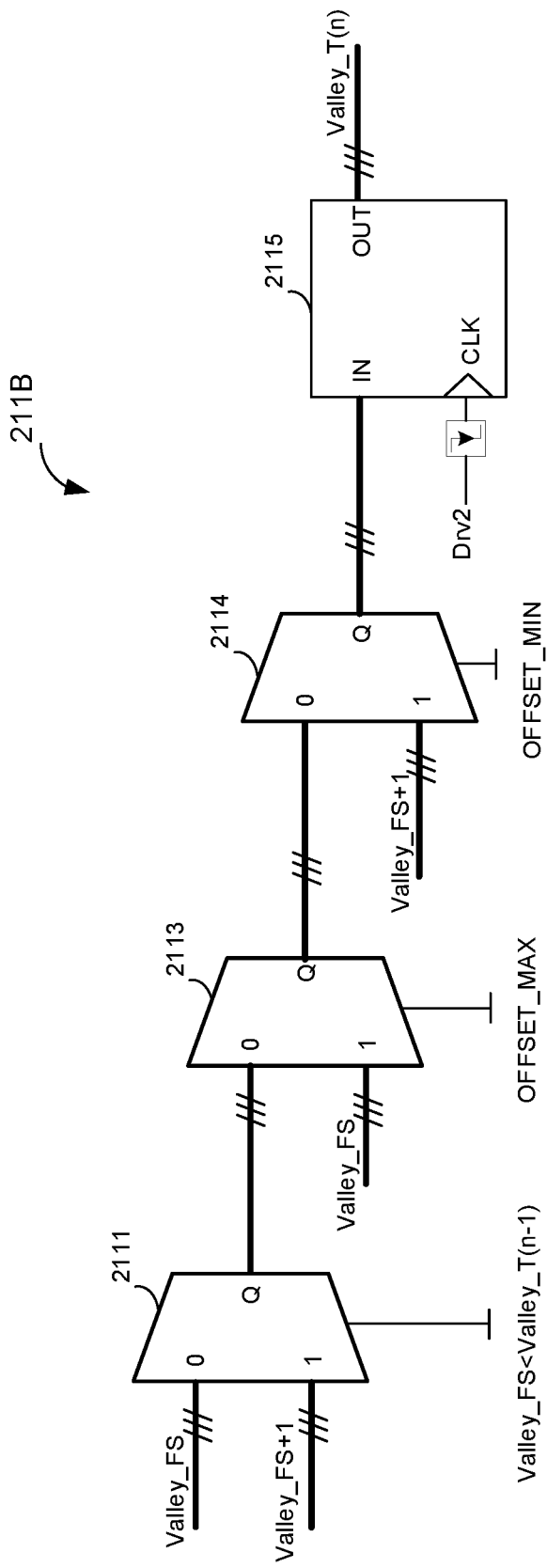
FIG. 7 schematically illustrate a target valley number generator 211B in accordance with an embodiment of the present invention.

FIG. 7 schematically illustrate a target valley number generator 211B in accordance with an embodiment of the present invention. In the example of FIG. 7, the target valley number generator 211B comprises a first selector 2111, a second selector 2113, a third selector 2114 and a register 2115. The first selector 2111 is configured to select the current valley count Valley_FS or Valley_FS+1 as a first selection output by comparing the current valley count Valley_FS and the last target valley number Valley_T(n−1). The second selector 2113 is configured to select the current valley count Valley_FS or the first selection output of the first selector 2111 as a second selection output by detecting whether the peak regulating signal OFFSET reaches the maximum value OFFSET_MAX. The third selector 2114 is configured to select the second selection output of the second selector 2113 and Valley_FS+1 as a third selection output by detecting whether the peak regulating signal OFFSET reaches the minimum value OFFSET_MIN.

The register 2115 is configured to receive the third selection output of the third selector 2114 and provide the current target valley number Valley_T(n) when the second switch SW2 is turned OFF. The register 2115 has an input terminal, a clock terminal and an output terminal, wherein the input terminal is coupled to the output terminal of the third selector 2114, the clock terminal is coupled to the second control signal Drv2 through a downward trigger, and the output terminal is configured to provide the current target valley number Valley_T(n).

Figure 8:
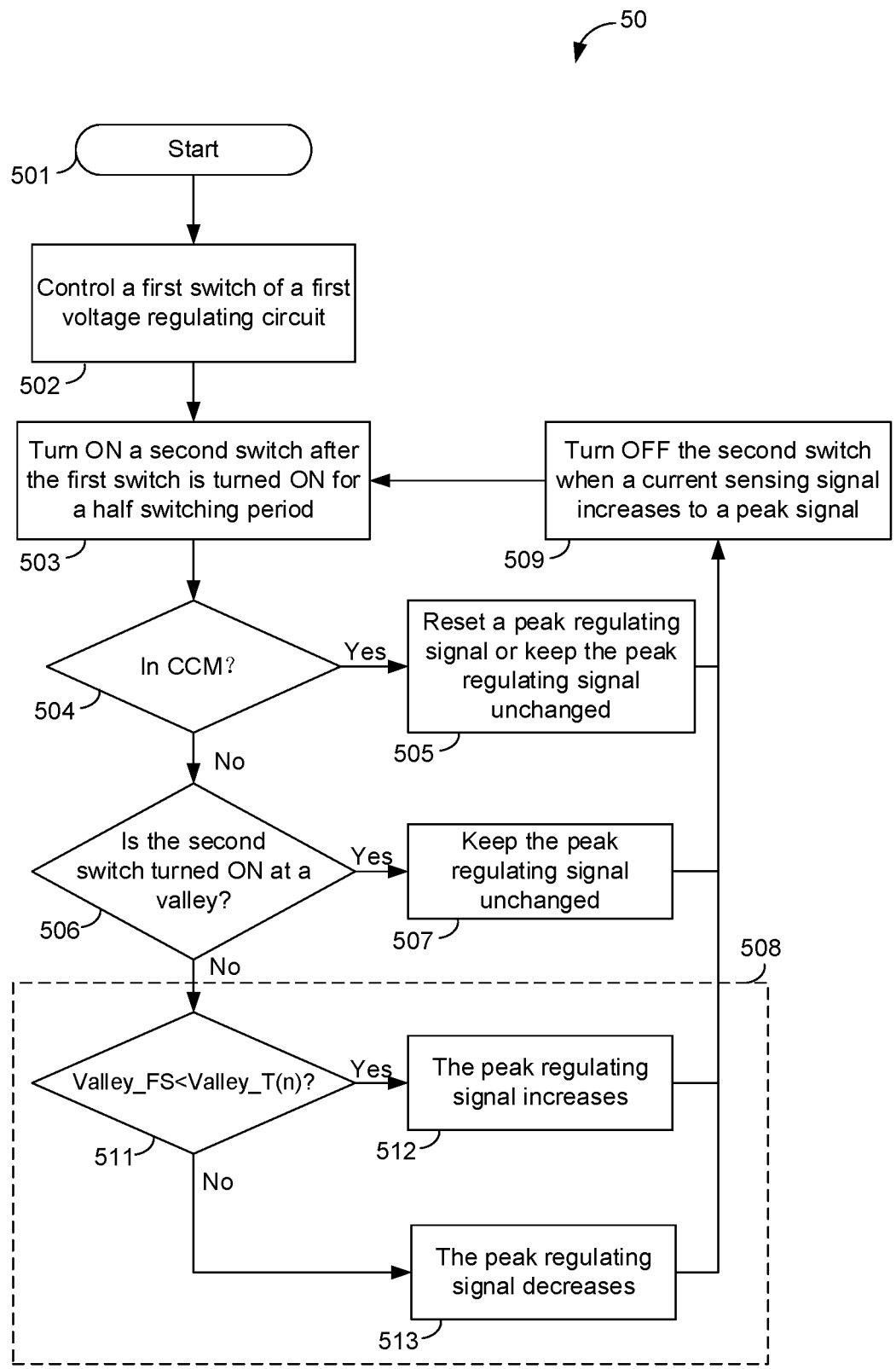
FIG. 8 illustrates a workflow of a control method 50 for controlling an interleaved switching converter in accordance with an embodiment of the present invention.

FIG. 8 illustrates a workflow of a control method 50 for controlling an interleaved switching converter in accordance with an embodiment of the present invention. The interleaved switching converter having a first and a second interleaved voltage regulating circuit, wherein the first voltage regulating circuit comprises a first switch and a transformer, the second voltage regulating circuit comprises a second switch and a second transformer. The control method 50 comprises steps 501~509.

The method 50 starts at step 501, a switching period of the interleaved switching converter begins, and then proceeds to step 502. At step 502, the first switch SW1 of the first voltage regulating circuit is controlled to work in CCM mode or quasi-resonant mode.

At step 503, the second switch is turned ON after the first switch is turned ON for a half switching period.

At step 504, the method 50 detects whether the interleaved switching converter works in CCM mode. If the interleaved switching converter works in CCM mode, the method 50 proceeds to step 505, the peak regulating signal is reset to be a default value or is kept unchanged. If the interleaved switching converter works in non-CCM mode, detecting if the voltage across the second switch falls into a valley region when the second switch is turned ON. If the voltage across the second switch falls in the valley region, the method 50 proceeds to step 507, the peak regulating signal is kept unchanged. Otherwise, the method 50 proceeds to step 508, the peak regulating signal is adjusted based on the comparison of the current valley count Valley_FS and the current target valley number Valley_T(n).

After steps 505, 507 or 508, the method 50 proceeds to step 509. At step 509, when a current sensing signal indicative of a current flowing through the second switch increases to a peak signal, the second switch is turned OFF, and then the method 50 goes back to step 503 and restarts a next switching period of the second switch.

In the example of FIG. 8, the step 508 further comprises steps 511~513. At step 511, a current valley count Valley_FS is compared with the current target valley number Valley_T(n). If Valley_FS<Valley_T(n), the peak regulating signal is increased at step 512. If Valley_FS>Valley_T(n), the peak regulating signal is decreased at step 513.

Figure 9:
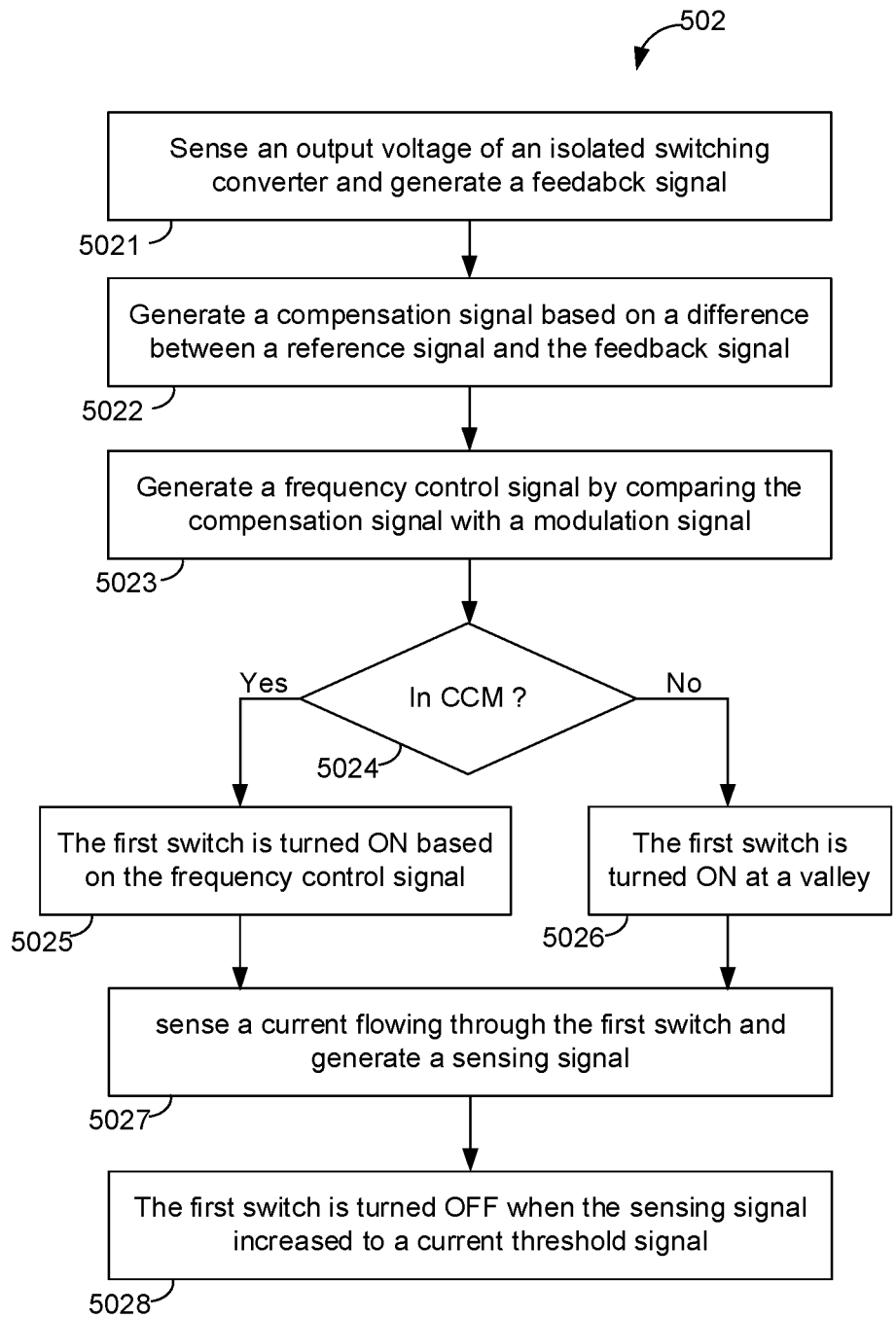
FIG. 9 illustrates a detailed workflow of the step 502 shown in FIG. 8 in accordance with an embodiment of the present invention.

FIG. 9 illustrates a workflow of the step 502 shown in FIG. 8 in accordance with an embodiment of the present invention. In the example of FIG. 9, step 502 further comprises steps 5021~5028.

At step 5021, an output voltage of the interleaved switching converter is sensed and a feedback signal is generated in response to the output voltage. At step 5022, a compensation signal is generated based on the difference between a reference signal and the feedback signal. At step 5023, the compensation signal is compared with a modulation signal, and a frequency control signal is generated.

At step 5024, detecting if the interleaved switching converter works in CCM mode. If yes, the method proceeds to step 5025, the first switch is turned ON based on the frequency control signal. If not, the method proceeds to step 5026, the first switch is turned ON at one valley. At step 5027, a sensing signal is generated in response to detecting a current flowing through the first switch. At step 5028, the first switch is turned OFF when the sensing signal is increased to a current threshold signal. In one embodiment, the step 502 further comprises the current threshold signal is generated in response to the frequency control signal.

The sequence of the workflow shown in FIG. 8 and FIG. 9 does not imply that process steps must be performed in a temporal or logical order according to such sequence. The process steps may be interchanged in any order without departing from the scope of the invention as long as such an interchange does not contradict the claim language and is not logically nonsensical. For example, step 5027 and step 5024 can be performed at the same time.

Although a flyback is used as an example in the interleaved switching converter, other type of switching converter with different topologies, including boost, buck-boost, buck, etc, may be used in place of the flyback.

In this document, relational terms such as first and second, and the like may be used solely to distinguish one entity or action from another entity or action without necessarily requiring or implying any actual such relationship or order between such entities or actions. Numerical ordinals such as "first," "second," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for an interleaved switching converter having a first and a second interleaved voltage regulating circuit, the control circuit comprising:
    a first controller configured to control a first switch of the first voltage regulating circuit operating in quasi-resonant mode;
    a second controller configured to control a second switch of the second voltage regulating circuit, comprising:
        a phase-shifted control circuit configured to provide a second ON control signal for turning-ON the second switch after the first switch is turned ON for a half switching period;
        a valley detection circuit configured to provide a valley pulse signal in response to one or more valleys of a voltage across the second switch during each OFF-time of the second switch;
        a peak signal generator configured to provide a peak signal based on the valley pulse signal, the second ON control signal and a threshold signal, and the peak signal is adjusted when the voltage across the second switch is higher than a valley reference at the time the second switch is turned ON; and
        a peak comparison circuit configured to compare the peak signal with a current sensing signal indicative of a current flowing through the second switch and provide a second OFF control signal for turning OFF the second switch.

2. The control circuit of claim 1, wherein the peak signal generator comprises:
    a valley counter configured to receive the valley pulse signal and provide a current valley count during each OFF-time of the second switch;
    a target valley number generator configured to provide a current target valley number based on the current valley count and a last target valley number;
    a trigger circuit configured to assert a trigger signal when the voltage across the second switch is higher than the valley reference at the time the second switch is turned ON; and
    a peak regulating circuit configured to add a peak regulating signal to the threshold signal, wherein when the trigger signal is asserted, the peak regulating signal is adjusted based on the comparison of the current valley count and the current target valley number.

3. The control circuit of claim 2, wherein:
    when the current valley count is higher than the current target valley number, the peak regulating signal is decreased; and
    when the current valley count is less than the current target valley number, the peak regulating signal is increased.

4. The control circuit of claim 2, wherein the peak regulating circuit comprises:
    a digital comparator configured to compare the current valley count with the current target valley number and provide a digital comparison signal;
    a D flip-flop configured to receive the digital comparison signal when the trigger signal is asserted;
    a digital-to-analog conversion circuit coupled to the D flip-flop and configured to provide the peak regulating signal; and
    a summing circuit configured to provide the peak signal by adding the peak regulating signal to the threshold signal.

5. The control circuit of claim 2, wherein the target valley number generator comprises:
    a selector configured to select the current valley count or the current valley count +1 as a selection output based on the comparison of the current valley count and the last target valley number; and
    a first register configured to receive the selection output of the selector and provide the current target valley number when the second switch is turned OFF.

6. The control circuit of claim 2, wherein the target valley number generator comprises:
    a first selector configured to select the current valley count or the current valley count +1 as a first selection output by comparing the current valley count and the last target valley number;
    a second selector configured to select the current valley count or the first selection output of the first selector as a second selection output by detecting whether the peak regulating signal reaches a maximum value;
    a third selector configured to select the second selection output of the second selector or the current valley count +1 as a third selection output by detecting whether the peak regulating signal reaches a minimum value; and
    a second register configured to receive the third selection output of the third selector and provide the current target valley number when the second switch is turned OFF.

7. The control circuit of claim 1, wherein the valley detection circuit comprises:
    a valley comparator configured to provide a valley comparison signal by comparing the voltage across the second switch with the valley reference;
    a RS flip-flop having a set terminal, a reset terminal and an output terminal, wherein the set terminal is configured to receive the valley comparison signal, the reset terminal is configured to receive the second ON control signal;
    an AND gate having a first input terminal, a second input terminal and an output terminal, wherein the first input terminal is coupled to receive the valley comparison signal through a NOT gate, the second input terminal is coupled to the output terminal of the RS flip-flop; and
    a one-shot circuit coupled to the output terminal of the AND gate and configured to provide the valley pulse signal.

8. The control circuit of claim 1, wherein the first controller comprises:
    an error amplifying circuit configured to receive a reference signal and a feedback signal indicative of an output voltage of the switching converter, wherein based on a difference between the reference signal and the feedback signal, the error amplifying circuit generates a compensation signal;
    a modulation signal generator configured to generate a modulation signal;
    a first comparison circuit configured to compare a current threshold signal with a sensing signal indicative of a current flowing through the first switch and provide a first OFF control signal for turning OFF the first switch;

a second comparison circuit configured to compare the compensation signal with the modulation signal and generate a frequency control signal;
a threshold generator configured to generate the current threshold signal based on the frequency control signal; and
wherein the first switch is turned ON when a voltage across the first switch during OFF-time of the first switch decreases to a valley threshold.

9. An interleaved switching converter comprising:
a first and second interleaved switch;
a first and second transformer;
a first controller configured to control the first switch operating in quasi-resonant mode;
a second controller configured to control the second switch, comprising:
  a phase-shifted control circuit configured to provide a second ON control signal for turning-ON the second switch after the first switch is turned ON for a half switching period;
  a valley detection circuit configured to provide a valley pulse signal in response to one or more valleys of a voltage across the second switch during each OFF-time of the second switch;
  a peak signal generator configured to provide a peak signal based on the valley pulse signal, the second ON control signal and a threshold signal, and wherein the peak signal is adjusted when the voltage across the second switch is higher than a valley reference at the time the second switch is turned ON; and
  a peak comparison circuit configured to compare the peak signal with a current sensing signal indicative of a current flowing through the second switch and provide a second OFF control signal for turning-OFF the second switch.

10. The switching converter of claim 9, wherein the first controller comprising:
an error amplifying circuit configured to receive a reference signal and a feedback signal indicative of an output voltage of the switching converter, wherein based on a difference between the reference signal and the feedback signal, the error amplifying circuit generates a compensation signal;
a modulation signal generator configured to generate a modulation signal;
a first comparison circuit configured to compare a current threshold signal with a sensing signal indicative of a current flowing through the first switch and provide a first OFF control signal for turning OFF the first switch; and
a second comparison circuit configured to compare the compensation signal with the modulation signal and provide a frequency control signal, and wherein the current threshold signal is adjusted based on the frequency control signal.

11. The switching converter of claim 9, the valley detection circuit comprising:
a valley comparator configured to compare the voltage across the second switch with the valley reference and provide a valley comparison signal at an output terminal;
a RS flip-flop having a set terminal, a reset terminal and an output terminal, wherein the set terminal is configured to receive the valley comparison signal, the reset terminal is configured to receive the second ON control signal;
a AND gate having a first input terminal, a second input terminal and an output terminal, wherein the first input terminal is coupled to receive the valley comparison signal through a NOT gate, the second input terminal is coupled to the output terminal of the RS flip-flop; and
a one-shot circuit coupled to the output terminal of the AND gate and configured to provide the valley pulse signal.

12. The switching converter of claim 9, wherein the peak signal generator comprising:
a valley counter configured to receive the valley pulse signal and provide a current valley count during each OFF-time of the second switch;
a target valley number generator configured to provide a current target valley number based on the current valley count and a last target valley number;
a trigger circuit configured to assert a trigger signal when the voltage across the second switch is higher than the valley reference at the time the second switch is turned ON; and
a peak regulating circuit configured to add a peak regulating signal to the threshold signal, wherein when the trigger signal is asserted, the peak regulating signal is adjusted based on the comparison of the current valley count and the current target valley number.

13. The switching converter of claim 12, wherein:
when the current valley count is higher than the current target valley number, the peak regulating signal is decreased; and
when the current valley count is less than the current target valley number, the peak regulating signal is increased.

14. A control method for an interleaved switching converter having a first and second interleaved voltage regulating circuit, the control method comprising:
controlling a first switch of the first voltage regulating circuit operating in quasi-resonant mode;
providing a second ON control signal for turning ON a second switch of the second voltage regulating circuit after the first switch is turned ON for a half switching period;
generating a current sensing signal by detecting a current flowing through the second switch;
providing a valley pulse signal in response to one or more valleys of a voltage across the second switch during each OFF-time of the second switch;
counting pulse number of the valley pulse signal and providing a current valley count during each OFF-time of the second switch;
providing a current target valley number based on the current valley count and a last target valley number;
comparing the current valley count and the current target valley number;
based on the comparison of the current valley count and the current target valley number, adjusting a peak regulating signal when the voltage across the second switch is higher than a voltage reference signal at the time the second switch is turned ON;
adding the peak regulating signal to a threshold signal to generate a peak signal; and
turning OFF the second switch when the current sensing signal increases to the peak signal.

15. The control method of claim 14, wherein adjusting the peak regulating signal comprising:
decreasing the peak regulating signal when the current valley count is higher than the current target valley number; and increasing the peak regulating signal when the current valley count is less than the current target valley number.

16. The control method of claim 14, wherein providing the current target valley number comprising:
when the current valley count is less than the last target valley number, the current valley count is selected to be the current target valley number; and
when the current valley count is higher than the last target valley number, the current valley count +1 is selected to be the current target valley number.

17. The control method of claim 16, further comprising:
when the peak regulating signal is increased to a maximum value, the current valley count is selected to be the current target valley number; and
when the peak regulating signal is decreased to a minimum value, the current valley count +1 is selected to be the current target valley number.

18. The control method of claim 14, further comprising:
sensing an output voltage of the switching converter and generating a feedback signal;
generating a compensation signal based on a difference between a reference signal and the feedback signal;
comparing the compensation signal with a modulation signal, and generating a frequency control signal.

19. The control method of claim 18, turning-OFF the first switch comprising:
sensing a current flowing through the first switch and generating a sensing signal;
generating a current threshold signal based on the frequency control signal; and
turning OFF the first switch when the sensing signal reaches the current threshold signal.

* * * * *